(12) United States Patent
Vemulapalli et al.

(10) Patent No.: US 11,126,879 B1
(45) Date of Patent: Sep. 21, 2021

(54) SPOOF DETECTION USING ILLUMINATION SEQUENCE RANDOMIZATION

(71) Applicant: EyeVerify, Inc., Kansas City, MO (US)

(72) Inventors: Spandana Vemulapalli, Kansas City, MO (US); David Hirvonen, Brooklyn, NY (US)

(73) Assignee: EyeVerify, Inc., Kansas City, MO (US)

( * ) Notice: Subject to any disclaimer, the term of this patent is extended or adjusted under 35 U.S.C. 154(b) by 0 days.

(21) Appl. No.: 17/225,797

(22) Filed: Apr. 8, 2021

(51) Int. Cl.
| | |
|---|---|
| *G06K 9/62* | (2006.01) |
| *G06K 9/00* | (2006.01) |
| *G06N 3/08* | (2006.01) |
| *G06K 9/46* | (2006.01) |
| *G06F 17/11* | (2006.01) |

(52) U.S. Cl.
CPC .......... *G06K 9/00906* (2013.01); *G06F 17/11* (2013.01); *G06K 9/00261* (2013.01); *G06K 9/00295* (2013.01); *G06K 9/4652* (2013.01); *G06K 9/4661* (2013.01); *G06K 9/6256* (2013.01); *G06N 3/08* (2013.01)

(58) Field of Classification Search
CPC .......... G06K 9/00906; G06K 9/00261; G06K 9/00295; G06K 9/4652; G06K 9/6256; G06K 9/2027; G06K 9/00288; G06K 9/4661; G06K 9/00604; G06K 9/0061; G06K 9/00617; G06K 9/00201; G06K 9/00268; G06K 9/00255; G06K 9/00892; G06K 9/2036; G06K 9/00214; G06K 9/00597; G06K 9/00899; G06N 3/08; G06F 21/32; H04W 12/12; H04W 12/065; H04W 12/65; H04W 12/00504; H04W 12/06; H04W 12/0605; H04L 63/0853; H04L 63/0861; G01B 11/25; G06T 2207/10016; G06T 2207/10024; G06T 2207/10048; G06T 2207/10152; G06T 2207/30041; G06T 7/40; G06T 7/521; G06T 7/55; G06T 7/62; G06T 7/90; G06T 7/97; H04N 5/2256
See application file for complete search history.

(56) References Cited

U.S. PATENT DOCUMENTS

| | | | | |
|---|---|---|---|---|
| 2014/0230046 | A1* | 8/2014 | Dewan | G06F 21/32 726/19 |
| 2015/0339471 | A1* | 11/2015 | Bennett | G06F 21/32 726/19 |
| 2017/0213096 | A1* | 7/2017 | Langley | G06K 9/00268 |

* cited by examiner

*Primary Examiner* — Michael J Vanchy, Jr.
(74) *Attorney, Agent, or Firm* — Fish & Richardson P.C.

(57) ABSTRACT

Technology described herein includes a method that includes obtaining a set of color-coded sequences, each of which includes a sequence of colors. Each color-coded sequence has auto-correlation properties characterized by a merit factor larger than a first predetermined threshold, and cross-correlation properties among the color-coded sequences characterized by a demerit factor lower than a second predetermined threshold. A color-coded sequence is randomly selected from the set of color-coded sequences. A subject is illuminated in accordance with the sequence of colors in the selected color-coded sequence. A sequence of images of the subject are captured, and are temporally synchronized with illumination by the color-coded sequence. A filtered response image is generated from the sequence of images by a matched filtering process. Based on the filtered response image, it is determined that the subject is an alternative representation of a live person. In response, access to a secure system is prevented.

20 Claims, 6 Drawing Sheets

SPOOF DETECTION USING ILLUMINATION SEQUENCE RANDOMIZATION

TECHNICAL FIELD

This specification generally relates to image capture devices.

BACKGROUND

Systems incorporating a biometric identification technology such as face recognition or iris recognition often include a camera that captures an image of a user. The captured image is then processed to authenticate the user using the biometric identification technology.

SUMMARY

In one aspect, this document describes a method for preventing access to a secure system based on determining that a subject is an alternative representation of a live person. The secure system is a system to which access is controlled, e.g. by using authentication and/or authorization of one or more users trying to access the system. The method includes obtaining a set of multiple color-coded sequences, wherein each color-coded sequence includes a sequence of colors, wherein each color-coded sequence has auto-correlation properties characterized by a merit factor larger than a first predetermined threshold, and cross-correlation properties among the color-coded sequences characterized by a demerit factor lower than a second predetermined threshold; randomly selecting a color-coded sequence from the set of color-coded sequences; illuminating a subject in accordance with the sequence of colors in the selected color-coded sequence; capturing a sequence of images of the subject, wherein the sequence of images are temporally synchronized with illumination by the color-coded sequence; generating, by a matched filtering process using the selected color-coded sequence, a filtered response image from the sequence of images of the subject; determining, based on the filtered response image, that the subject is an alternative representation of a live person; and responsive to determining that the subject is the alternative representation of the live person, preventing access to a secure system.

In another aspect, this document describes a system for preventing access to a secure system based on determining that a subject is an alternative representation of a live person. The system includes one or more computers; and one or more computer memory devices interoperably coupled with the one or more computers and having tangible, non-transitory, machine-readable media storing one or more instructions that, when executed by the one or more computers, perform various operations. The operations include obtaining a set of multiple color-coded sequences, wherein each color-coded sequence includes a sequence of colors, wherein each color-coded sequence has auto-correlation properties characterized by a merit factor larger than a first predetermined threshold, and cross-correlation properties among the color-coded sequences characterized by a demerit factor lower than a second predetermined threshold; randomly selecting a color-coded sequence from the set of color-coded sequences; illuminating a subject in accordance with the sequence of colors in the selected color-coded sequence; capturing a sequence of images of the subject, wherein the sequence of images are temporally synchronized with illumination by the color-coded sequence; generating, by a matched filtering process using the selected color-coded sequence, a filtered response image from the sequence of images of the subject; determining, based on the filtered response image, that the subject is an alternative representation of a live person; and responsive to determining that the subject is the alternative representation of the live person, preventing access to a secure system.

In another aspect, this document describes one or more non-transitory computer-readable storage devices coupled to one or more processors and having instructions stored thereon which, when executed by the one or more processors, cause the one or more processors to perform various operations. The operations include obtaining a set of multiple color-coded sequences, wherein each color-coded sequence includes a sequence of colors, wherein each color-coded sequence has auto-correlation properties characterized by a merit factor larger than a first predetermined threshold, and cross-correlation properties among the color-coded sequences characterized by a demerit factor lower than a second predetermined threshold; randomly selecting a color-coded sequence from the set of color-coded sequences; illuminating a subject in accordance with the sequence of colors in the selected color-coded sequence; capturing a sequence of images of the subject, wherein the sequence of images are temporally synchronized with illumination by the color-coded sequence; generating, by a matched filtering process using the selected color-coded sequence, a filtered response image from the sequence of images of the subject; determining, based on the filtered response image, that the subject is an alternative representation of a live person; and responsive to determining that the subject is the alternative representation of the live person, preventing access to a secure system.

Implementations of the above aspects can include one or more of the following features. The alternative representation of the live person includes a previously captured photograph of the live person printed on paper, or an image presented on a display device. The alternative representation of the live person includes video replay of the live person on a display device. Determining, based on the filtered response image, that the subject is the alternative representation of the live person includes processing the filtered response image using a machine learning process trained to discriminate between filtered response images of live persons and filtered response images of alternative representations of the live persons. Generating, by the matched filtering process using the selected color-coded sequence, the filtered response image from the sequence of images of the subject includes generating, from the sequence of images, a sequence of spatially aligned images; calculating a sequence of filtered response images by applying a matched filter to the sequence of spatially aligned images, wherein the matched filter corresponds to the selected color-coded sequence; and selecting the filtered response image from the sequence of filtered response images. The merit factor is defined as:

$$\sum_{d=1}^{M} \frac{|C_{f,f}(0, d)|^2}{\sum_{s'=0}^{2N-1} |C_{f,f}(s, d)|^2},$$

wherein M is a total number of colors in the color-coded sequence, N is length of the color-coded sequence, d is an index for the colors, $C_{f,f}$ is a one-dimensional discrete auto-correlation function of a color-coded sequence f, s is a correlation index in the function $C_{f,f}$, and the demerit factor is defined as $$\sum_{d=1}^{M} \frac{\sum_{s!=0}^{2N-1} |C_{f,g}(s,d)|^2}{|C_{f,f}(0,d)| \cdot |C_{g,g}(0,d)|},$$

wherein $C_{g,g}$ is a one-dimensional discrete auto-correlation of a color-coded sequence g, $C_{f,g}$ is a one-dimensional discrete cross-correlation of the color-coded sequence f and the color-coded sequence g. The method or the operations can further include randomly selecting a second color-coded sequence from the set of color-coded sequences; illuminating a second subject in accordance with the sequence of colors in the second color-coded sequence; capturing a second sequence of images of the second subject, wherein the second sequence of images are temporally synchronized with illumination by the second color-coded sequence; generating, by a matched filtering process using the second selected color-coded sequence, a second filtered response image from the second sequence of images of the second subject; determining, based on the second filtered response image, that the second subject is a live person; and responsive to determining that the second subject is the live person, initiating an authentication process for determining if the live person is authorized to access the secure system.

Particular implementations of the subject matter described in this disclosure can be implemented so as to realize one or more of the following advantages. Implementations of the present disclosure can be used, for example, in a camera-based liveness classification process. The implementations of the present disclosure can use a temporal color-coded sequence in screen illumination and can use matched filters to analyze reflectance properties of a subject in the scene for the purpose of liveness classification of the subject. In particular, an authentication server can generate a set of complementary color-coded sequences and can randomly select a color-coded sequence from the set at runtime. The randomized selection process reduces the probability that an attacker is able to select the same sequence as the sequence selected by the authentication server. Furthermore, the set of sequences is generated to have strong auto-correlation properties individually, while having weak cross-correlation properties collectively. Because of this property, this implementation ensures that all non-matching sequences selected from the set are not correlated enough to produce a response that has similar reflective properties of a live person. For example, when an attacker uses video replay attack that adds color illumination effects with a non-matching sequence to a video, the reflective properties of the video replay attack cannot resemble the reflective properties of a live person. Based on that, the authentication server can determine that the subject is an alternative representation of a live person, and can prevent the attacker from accessing a secure system. In some implementations, one or more of the steps above can be performed by an authentication client running on a client device, e.g., a mobile device of a user.

The technology described herein can therefore facilitate implementation of spoof detection based on active illumination techniques using the available user device, without the need for an additional device. The image acquisition device can be a camera installed on a mobile device, or a camera installed on a kiosk device, etc. The illumination device can be the display screen of a mobile device or a kiosk device, or an illumination source of a kiosk device. This spoof detection system can be implemented on resource-constrained environments such as mobile devices, reducing hardware complexities associated with other devices that use more complex biometric authentication systems. The technology described herein does not require previous acquisition and storage of user images or videos on a database, because the method can perform liveness detection based on lively and instantaneously-captured images, without a need to perform any comparison with previously captured user images or videos. By allowing a quick discrimination between captured images of a live person and captured images of a spoof alternative representation, additional processing can be preemptively terminated, thereby creating an additional layer of security.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

Like reference numbers and designations in the various drawings indicate like elements.

DETAILED DESCRIPTION

Figure 1:
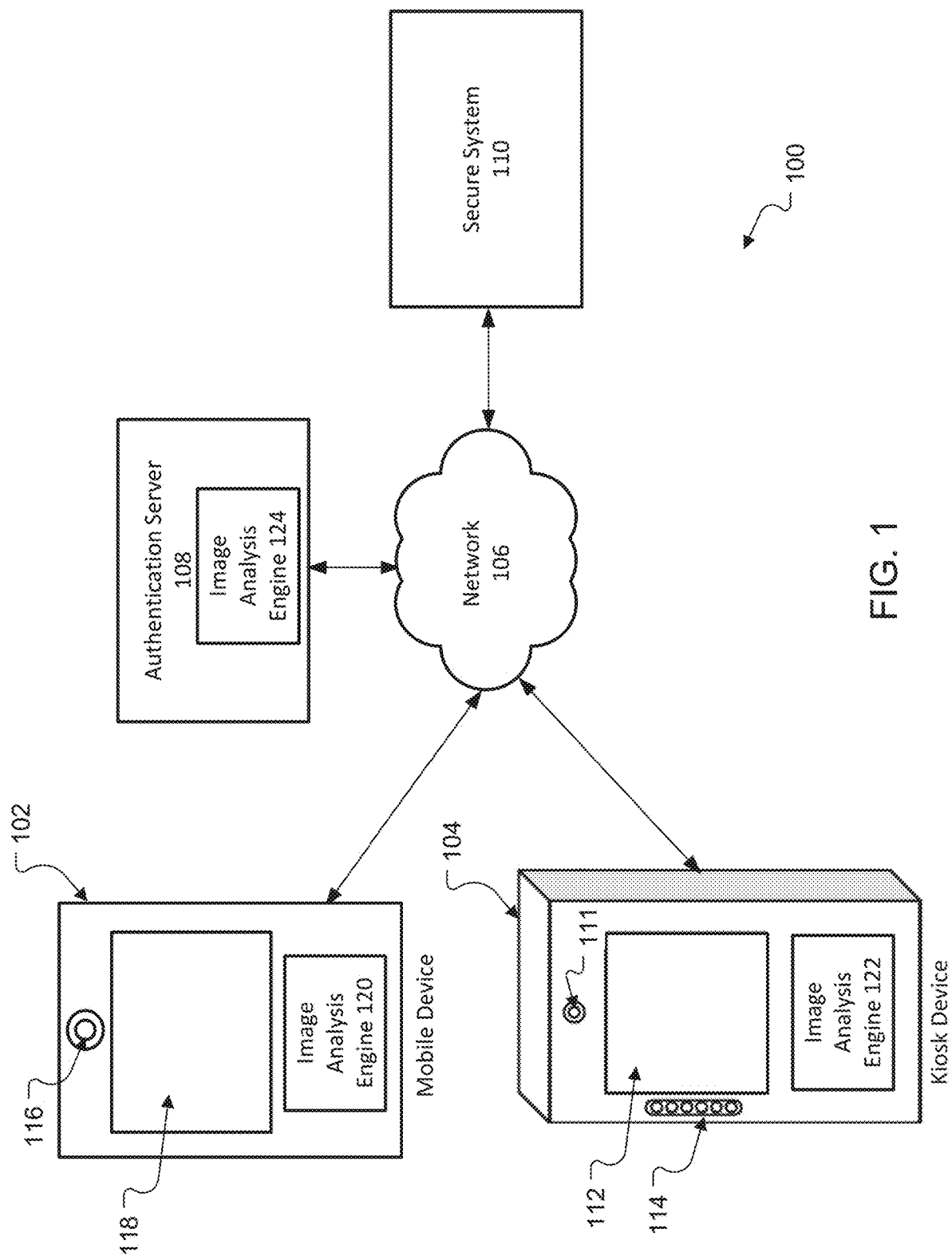
FIG. 1 shows an example environment in which the technology described herein may be used.

Many biometric authentication systems involve authenticating a user to a secure system based on recognizing the user's face, eye-print, iris, etc. Such biometric authentication systems involve capturing one or more images of a user, and executing corresponding recognition processes on the captured image. Malicious attempts to breach the security of such a biometric authentication system can include presenting an alternative representation of a live person to gain access to an account or other privileges associated with the identity of the corresponding live person. Such attacks are generally known as spoof attacks, and the reliability and security of a biometric authentication system can be determined by the ability of the system to differentiate between a live person and corresponding alternative representations (also referred to as spoofs). The technology described herein improves security and reliability of biometric authentication systems that rely on recognizing a user based on face recognition, eye-print recognition, iris recognition, etc. Specifically, this document describes techniques that allow for determining whether the captured images correspond to an actual live person or a spoof alternative representation, such as a printed or displayed image/photograph of the live person.

In some implementations, the technology described herein involves illuminating the subject with a color-coded sequence (e.g., displayed on a screen of a user device). The illumination using the color-coded sequence may also be referred to as active illumination. A corresponding sequence of images is synchronously captured using an image capture device such as a camera of the user device. A matched filtering process is applied to the captured sequence of illuminated images to generate a filtered response image. The filtered response image can show information of the illuminated subject, such as shape information and texture information, etc. By performing image analysis on the filtered response image, a determination can be made whether the illuminated subject is a live person or an alternative representation (e.g., a photo, a digital image, a video replay, etc.) of a live person. If the subject is determined to be an alternative representation, any access attempt to an underlying secure system can be prevented, for example, by aborting any authentication process.

In some implementations, the captured sequence of images can be correlated with the illumination sequence to determine whether the captured sequence is legitimate, or coming from an attack source. For example, in implementations of the present disclosure, the color-coded sequence used for the active illumination in a particular instance is randomly selected from a set of multiple color-coded sequences, e.g., a set of 50 color-coded sequences. The set of sequences is generated to have strong auto-correlation properties individually, while having weak cross-correlation properties with other sequences in the set. The randomized sequence selection process reduces the probability of the attacker correctly guessing a correct sequence, thereby improving the security of the underlying system. The unique auto-correlation and cross correlation properties of the set of the sequences further ensure that all non-matching sequences selected from the set are weakly correlated and cannot produce a filtered response image that resembles a filtered response generated with a matching sequence. Therefore, the implementations of the present disclosure can improve security of a secure system protected by a biometric authentication process, even when the attacker uses sophisticated video replay attack schemes with added color illumination effects.

Based on detecting that the captured image sequence is a spoof, any further processing of the image to allow access to a corresponding secure system can be prevented, thereby adding an additional layer of security to the system in addition to the existing authorization and/or authentication techniques, e.g., password verification, or facial recognition. The technology can be used in mobile devices, as well as in larger devices (e.g., kiosk devices). Examples of these environments are described next.

FIG. 1 shows an example environment 100 in which the technology described herein may be used. The example environment 100 includes network 106, an authentication server 108, a secure system 110 and a user device. The user device can be a mobile device 102, or a kiosk device 104, or other types of user devices, etc.

In some implementations, the user device can be a kiosk device 104. The kiosk device can be used for various purposes that require authenticating users via one or more biometric authentication processes. For example, the kiosk device 104 can include an ATM that allows a user to withdraw money from a bank account. In another example, the kiosk device 104 can be deployed at a restaurant or a fast-food outlet, and can allow a user to order and pay for food. The kiosk device 104 can also be deployed at an entry point (e.g., at the gate of an arena or stadium) at various types of locations to authenticate users interactively, or even without any active participation of the user.

In some implementations, the kiosk device 104 can include one or more components that support a biometric authentication system. The kiosk 104 can include a camera 111. The camera 111 can be employed to capture images of, for example, users interacting with the kiosk 104. The kiosk device 104 can include a display device 112 (e.g., a capacitive touch screen) that allows a user to interact with the kiosk device 104, e.g., selecting and ordering food at a retail outlet. Once the user completes the interaction via user-interfaces presented on the display device 112, the user may be asked to look towards the camera 111 for biometric authentication.

The biometric authentication process performed using an authentication system such as one shown in FIG. 1 can include a liveness detection process. Multiple images captured using the camera 111 are analyzed to determine whether the subject in the images is an actual live person, or an alternative representation of the live person. For example, an alternative representation of a live person can be a photograph of a live person or an image of the live person displayed on a high definition display device, or a video replay of the live person, and so on.

The kiosk device 104 can use an active illumination method to perform the liveness detection. The kiosk device 104 illuminates the user in accordance with a sequence of colors in a selected color-coded sequence. The selected color-coded sequence is randomly selected from a set of color-coded sequences. The set of sequences is generated to have strong auto-correlation properties individually, while having weak cross-correlation properties collectively. More details of generating the set of color-coded sequences and the randomized selection process are described below in connection with FIGS. 3A-3B.

The kiosk device 104 can illuminate the user using the display device 112 or an illumination source 114. In some implementations, the kiosk device 104 can show the sequence of colors on the display device 112 and use the display device 112 to illuminate the user. In some implementations, the kiosk device 104 can include an illumination source 114. Although one illumination source 114 is shown in FIG. 1, the kiosk 100 may include multiple illumination sources. Although implementations of the present disclosure are described as using one illumination source, multiple illumination sources can be used. The illumination source 114 can include one or more light emitting diode (LED) elements that may be controlled to generate electromagnetic radiation sequences according to the selected color-coded sequence. For example, the illumination source 114 can illuminate a subject's face in a specified light color pattern.

Figures 2, 3A, 3B:
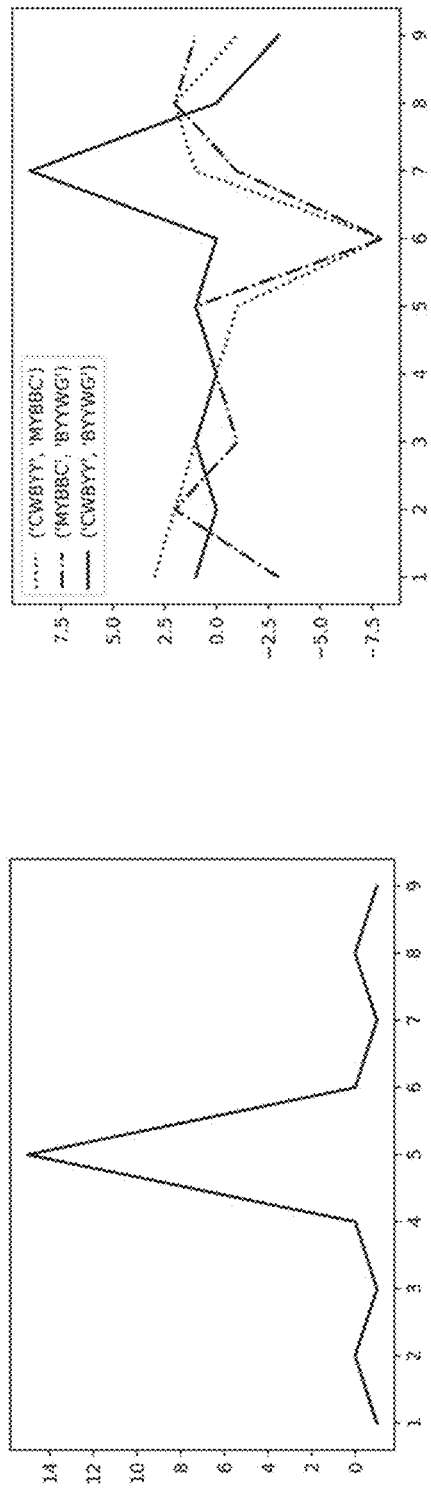
FIG. 2 shows an example of a color-coded sequence.
FIG. 3A shows the autocorrelation function of the color-coded sequence in FIG. 2.
FIG. 3B shows the cross-correlation functions between three color-coded sequences.

FIG. 2 shows an example of a color-coded sequence 200. The color-coded sequence 200 is Blue, Yellow, Yellow, White, and Green ("BYYWG"). The kiosk device can show the sequence of colors at predetermined intervals either on the display device 112 or through the illumination source 114. For example, the kiosk device can use the display device 112 to display the sequence of colors as a series of quick flashes that are synchronized with the camera such that the camera captures at least one image under illumination by each color.

The kiosk device 104 can use the camera 111 to capture a sequence of images of the illuminated subject. The sequence of images is temporally synchronized with the illumination by the color-coded sequence. For example, the camera 111 can capture the first image at a time point when the display device 112 displays the blue color, and can capture the second image, third image, fourth image, and fifth image in one-second intervals that are synchronized with the display of the color-coded sequence.

In some implementations, the user device can be a mobile device 102. The mobile device 102 can be used for various purposes that require authenticating users via one or more biometric authentication processes. For example, the mobile device 102 can be used to authenticate a user for one or more services (e.g., a payment processing service) made available to the user via an application executing on the mobile device. The application executing on the mobile device 102 can require the user to be authenticated via a biometric authentication process before allowing access to a secure system 110 associated with the services. In some implementations, a biometric authentication process that is based on face, iris, eyeprint, etc., may require capture of a facial image of the user.

The mobile device 102 can include a camera 116 that can be employed to capture images of a user of the mobile device. The mobile device 102 can include a display screen 118 (e.g., a touch screen) that allows a user to interact with the mobile device 102, e.g., performing a payment process on the mobile device.

Similar to the liveness detection process described for the kiosk device 104, the mobile device 102 can use an active illumination method to perform the liveness detection. The mobile device 102 illuminates the subject in accordance with a color-coded sequence that is randomly selected from a set of color-coded sequences. The mobile device 102 can illuminate the subject using the display screen 118. For example, the mobile device 102 can show the sequence of colors on the display screen 118. The mobile device can use the camera 116 to capture a sequence of images of the illuminated subject. The sequence of images is temporally synchronized with the illumination by the color-coded sequence.

The sequence of images captured by the user device can be analyzed using an image analysis engine (e.g., image analysis engine 120, 122, or 124). The image analysis engine can generate a filtered response image by a matched filtering process using the selected color-coded sequence. Based on the filtered response image, the image analysis engine can determine whether the subject is an alternative representation of a live person. More details about the matched filtering process are described in connection with FIGS. 4A-4B.

In some implementations, the image analysis engine can be located at a remote location with respect to the user device 102 or 104. For example, the image analysis engine 124 can be implemented on a server that is remotely located with respect to a mobile device 102 or kiosk 104 on which the sequence of images is captured. As shown in FIG. 1, for example, the image analysis engine 124 can be implemented on the authentication server 108. In such cases, the user device 102 or 104 can communicate with the image analysis engine 124 over one or more networks 106.

In some implementations, at least a portion of the image analysis engine can be located on the same user device that captured the sequence of images. For example, the kiosk device 104 can include an image analysis engine 122 that can perform a matched filtering process using the selected color-coded sequence and can generate a filtered response image. The kiosk device 104 can send the filtered response image over the network 106 to the authentication server, instead of sending the sequence of images, reducing the traffic on the network 106. After receiving the filtered response image, the image analysis engine 124 on the authentication server 108 can process the filtered response image using a machine learning algorithm trained to discriminate between filtered response images of live people and filtered response images of alternative representations of the live people.

As another example, the mobile device 102 can include an image analysis engine 122 that can discriminate filtered response images of alternative representations of the live people based on the previously trained machine learning algorithm. The mobile device 102 can perform the entire liveness detection process within the mobile device, including generating the filtered response image and determining whether the subject is an alternative representation of a live person using a trained machine learning algorithm.

The authentication server 108 controls whether a user device can have access to the secure system 110. For example, the image analysis engine can determine, based on the sequence of images, that a subject in the sequence of images is an alternative representation of a live person. This can happen, for example, during a malicious attempt of unauthorized access to the secure system 110 in which the perpetrator of the attempt points the user device towards a high quality photograph of an authorized user that is printed on paper, or a recorded video of the authorized user displayed on a high resolution display device. Responsive to determining that the subject is an alternative representation of a live person, the image analysis engine can preemptively prevent any of the images to be further processed by the authentication server 108, thereby preventing access to the secure system 110. On the other hand, if the image analysis engine determines that the subject of the images is a liver person, an authentication process based on one or more images of the subject can be initiated (e.g., at the authentication server 108) to determine if the liver person is authorized to access the secure system. For example, after determining the liveness detection result, the mobile device 102 or the kiosk device 104 can send the liveness detection result to the authentication server 108 over a network 106. Based on the liveness detection result, the authentication server 108 can allow or prevent access to the secure system 110.

The network 106 includes one or more of the following: a local area network (LAN), wide area network (WAN), the Internet, a virtual private network (VPN), etc., or a combination thereof. The network 106 connects user devices (e.g., the kiosk device 104, or the mobile device 102, etc.), the authentication server 108, and the secure system 110. In some implementations, the network 106 can be accessed over a wired and/or a wireless communications link.

Due to the highly visible nature of this active illumination-based liveness method, it is expected that malicious attackers might extend and customize standard spoof attacks with various color flashes in an attempt to defeat the liveness detection process. For example, if the active illumination sequence on the device screen is highly correlated with the sequence injected/manipulated in the spoof video, and the presentation is both realistic and well synchronized with active illumination on the device, the filtered response image may resemble that of a live user closely enough to defeat liveness detection. If the active illumination configuration only employs a single fixed sequence, it can be predicted and replicated, leaving the method vulnerable to attack.

To protect against such attacks, it is desirable to construct a set of complementary color-coded sequences and select from them randomly at runtime. These sequences are constructed to exhibit strong auto-correlation properties individually, while exhibiting weak cross-correlation properties collectively. The randomization process itself reduces the probability that the attacker selects the correct sequence, and the sequence construction further ensures that all non-matching sequences selected from the set are not correlated enough to produce a live response by chance.

In some implementations, the set of color-coded sequences can be generated by first generating a set of candidate sequences, and then selecting from the candidates using their auto-correlation properties and their cross-correlation properties.

In some implementations, the set of candidate sequences can be generated by enumerating them. When the sequence length is N, the dimension of each code in the sequence is d, and the number of bits for each code is K, the total number of candidate sequences are $K^{(d*N)}$ For example, as shown in FIG. 2, the length of a color-coded sequence can be five (N=5) because shorter sequences can improve user experience. Each code has three dimensions (d=3), e.g., RGB pixel triples. Each code is binary (K=2). Therefore, for length five color-coded sequence, there are $2^{15}$ candidate sequences.

FIG. 3A shows the autocorrelation function of the color-coded sequence in FIG. 2. This shows that the color-coded sequence 200 has strong auto-correlation property, with a value of 15 at its peak and very low value at its side lobes.

In some implementations, a merit factor can be used to measure the auto-correlation property of a color-coded sequence. In general, a merit factor is used for one-dimensional signals. The concept of the merit factor is extended to an N-dimensional color-coded sequence, e.g., a three-dimensional RGB coded-coded sequence, in order to evaluate the auto-correlation property of the sequence.

For example, the merit factor can be defined as the following:

$$\sum_{d=1}^{3} \frac{|C_{f,f}(0, d)|^2}{\sum_{s!=0}^{2N-1} |C_{f,f}(s, d)|^2}, \quad (1)$$

where d is the number of dimensions (e.g., 3 for RGB colors), $C_{f,f}$ is the one-dimensional discrete auto-correlation function of the signal f to itself, s is the correlation index with the index 0 corresponding to the peak of the auto-correlation function, and N is the length of the sequence (e.g., length can be 5 or 7).

The merit factor for each candidate sequence can be calculated and ranked. A set of preferred sequences can then be selected based on the corresponding merit factors satisfying a threshold condition. In some implementations, a subset of candidate sequences corresponding to the highest merit factor among all candidate sequences can be selected as the preferred sequences having strong auto-correlation properties. For example, for length five color-coded sequence, there can be 1152 preferred sequences out of the $2^{15}$ candidate sequences, and the 1152 preferred sequences all have a highest merit factor value of 56.25 among all the candidate sequences. In some implementations, sequences with the top two or three highest merit factors may be chosen as the preferred sequences.

Out of the selected sequences with the highest merit factor, a subset of sequences are generated such that they have weak cross-correlation properties. In some implementation, the number of sequences in the set can be predetermined, e.g., the set can include 50 sequences. FIG. 3B shows the cross-correlation functions between three color-coded sequences. The three color-coded sequences are "CWBYY" (cyan-white-blue-yellow-yellow), "MYBBC" (magenta-yellow-blue-blue-cyan), and "BYYWG" (blue-yellow-yellow-white-green). FIG. 3B shows three cross-correlation functions. Each cross-correlation function is calculated between a pair of color-coded sequences. For example, the solid line shows the cross-correlation function between the "CWBYY" sequence and the "BYYWG" sequence. The peak value of this cross-correlation function is about 9, which is much lower than the peak value of the auto-correlation of the sequence "BYYWG" shown in FIG. 3A. In some implementations, it may be desirable to use a single numerical value to measure the cross-correlation property.

In some implementations, a demerit factor can be used to measure the cross-correlation properties of a set of color-coded sequences. In general, the demerit factor is the reciprocal of the merit factor for one-dimensional signals. The concept of the demerit factor is extended to the N-dimensional color-coded sequences, e.g., three-dimensional RGB coded-coded sequences, in order to evaluate the cross-correlation property between two sequences.

For example, the demerit factor can be defined as the following:

$$\sum_{d=1}^{3} \frac{\sum_{s!=0}^{2N-1} |C_{f,g}(s, d)|^2}{|C_{f,f}(0, d)| \cdot |C_{g,g}(0, d)|} \quad (2)$$

where d is the number of dimensions (e.g., 3 for RGB colors), $C_{f,f}$ is the one-dimensional discrete auto-correlation function of the signal f to itself, $C_{g,g}$ is the one-dimensional discrete auto-correlation function of the signal g to itself, $C_{f,g}$ is a one-dimensional discrete cross-correlation function of the signal f and the signal g, s is the correlation index with the index 0 corresponding to the peak of the cross-correlation function, and N is the length of the sequence.

In some implementations, exhaustive search can be used to generate a set of color-coded sequences using the demerit factor. For example, among the 1152 sequences that have a merit factor of 56.25, a subset of twenty RGB sequences of length five can be exhaustively listed. The demerit factor can be calculated for each pair of sequences in each set. Selection of the sequences can be based on the corresponding sequence satisfying another threshold. In some implementations, the set that has the lowest demerit factor can be selected because this set has the weakest cross-correlation property. For example, each pair of sequences shown in FIG. 3B has the lowest demerit factor of 0.026, and therefore the set of sequences (CWBYY, MYBBC, BYYWG) can be selected as having the weakest cross-correlation properties. In some implementations, sequences corresponding to a set of two or more lowest demerit factors can be selected.

In some implementations, the authentication server 108 can perform the above described selection process of the set of multiple color-coded sequences. After generating the set of color-coded sequences, the authentication server 108 can send the set of color-coded sequences to a user device over the network 106. In some implementations, a user device or another remote system can generate the set of multiple color-coded sequences.

Figure 4A:
FIG. 4A shows a filtered response image generated for a spoofing video that has an illumination effect using the same color-coded sequence as the sequence used by a user device.
Figure 4B:
FIG. 4B shows a filtered response image generated for a spoofing video that has an illumination effect using a color-coded sequence that is different from the sequence used by a user device.

FIG. 4A-4B shows a filtered response image generated in the liveness detection process. After obtaining the sequence of images of the subject, an image analysis engine can be configured to execute a matched filtering process on the sequence of images. The matched filtering process can generate a filtered response image from the sequence of images of the subject using a matched filter. The matched filter is configured according to the selected color-coded sequence. For example, a matched filter for a color-coded sequence "BYYWG" can be a filter with same sequence "BYYWG" such that the filter matches with the illumination sequence.

A captured image of an alternative representation of a live person can have different image features than that of a live person. The captured image of the spoof can have different shape information due to changes in the depth and angle of reflection, e.g., a display screen (2D) vs a human face (3D). The captured image of the spoof can have different texture information, due to surface material, e.g., photo vs human skin.

The filtered response image can enhance the image feature differences in the sequence of images. For example, variations in signal magnitude in the filtered response image can better reveal the shape information and the texture information of the illuminated subject. Therefore, filtered response images of sufficiently high signal-to-noise ratio (SNR) can provide a rich representation for liveness detection.

For example, the filtered response image can show depth discontinuities. Live samples are characterized by a filtered response image with appearance that reveals the underlying 3D face structure of a human face. The magnitude of each pixel in the filtered response image is inversely proportional to the angle of incidence of the active illumination. For example, the nose tip and the cheek bones of a live person can provide strong reflections, while the sides of the face of a live person can provide weaker reflection because the sides of the face angel away from the camera. On the contrary, a 2D photo exhibits a flatter appearance in the filtered response image. Additionally, a 2D photo lacks discontinuity in the filtered response image along the contour of the face. As another example, monitor based attacks display an image or a video of a live person. A monitor has reflective films and is a light source itself. Because monitors can emit and reflect light like a mirror, the filtered response image observed in a monitor attack can be very weak overall and can have localized high intensity responses.

If the active illumination configuration only employs a single fixed sequence, it can be predicted and replicated, leaving the method vulnerable to attack. For example, FIG. 4A shows a filtered response image generated for a spoofing video that has illumination effect using the same color-coded sequence as the sequence used by a user device. The user device illuminates the subject using the color-coded sequence "BYYWG" as shown in FIG. 2. In this case, the subject is a spoofing video of a live person. The spoofing video includes color illumination effects using the same color-coded sequence "BYYWG". The color illumination effects were added to the video by the attacker. Thus, the spoofing video includes the color illumination effects that match the color-coded sequence "BYYWG" used in the active illumination process. Because of this, the image appearance of the filtered response image in FIG. 4A shows the same kind of image appearance of a filtered response image of a live person, e.g., with high signal magnitude, and with depth discontinuities on the sides of the cheek. The liveness detection process hence accepts this subject as a live person.

With the technology described herein, the user device randomly selects a color-coded sequence from the set of multiple color-coded sequences. The randomization process itself reduces the probability of the attacker selecting the correct sequence, and the sequence construction further ensures that all non-matching sequences selected from the set are not correlated enough to produce a live response by chance.

For example, FIG. 4B shows a filtered response image generated for a spoofing video that has illumination effect using a color-coded sequence that is different from the sequence used by a user device. In this case, the subject is also a spoofing video of a live person. The user device illuminates the subject using the color-coded sequence "MYBBC". The spoofing video includes color illumination effects using a different color-coded sequence "BYYWG". The illumination effects were added to the video by the attacker. Thus, the spoofing video includes the color illumination effects that do not match the color-coded sequence used in the active illumination process. Two color-coded sequences from the set of color-codes sequences are designed to have weak cross-correlation. Because of the weak cross-correlation, the filtered response image in FIG. 4B is a weak and noisy image, e.g., with low signal magnitude, with continuous responses on the sides of the cheek, and with localized high intensity responses. The filtered response image in FIG. 4B does not represent the image features of a filtered response image of a live person. The liveness detection process hence determines that this subject is an alternative representation of a live person and rejects further access to the secure system.

Figure 5:
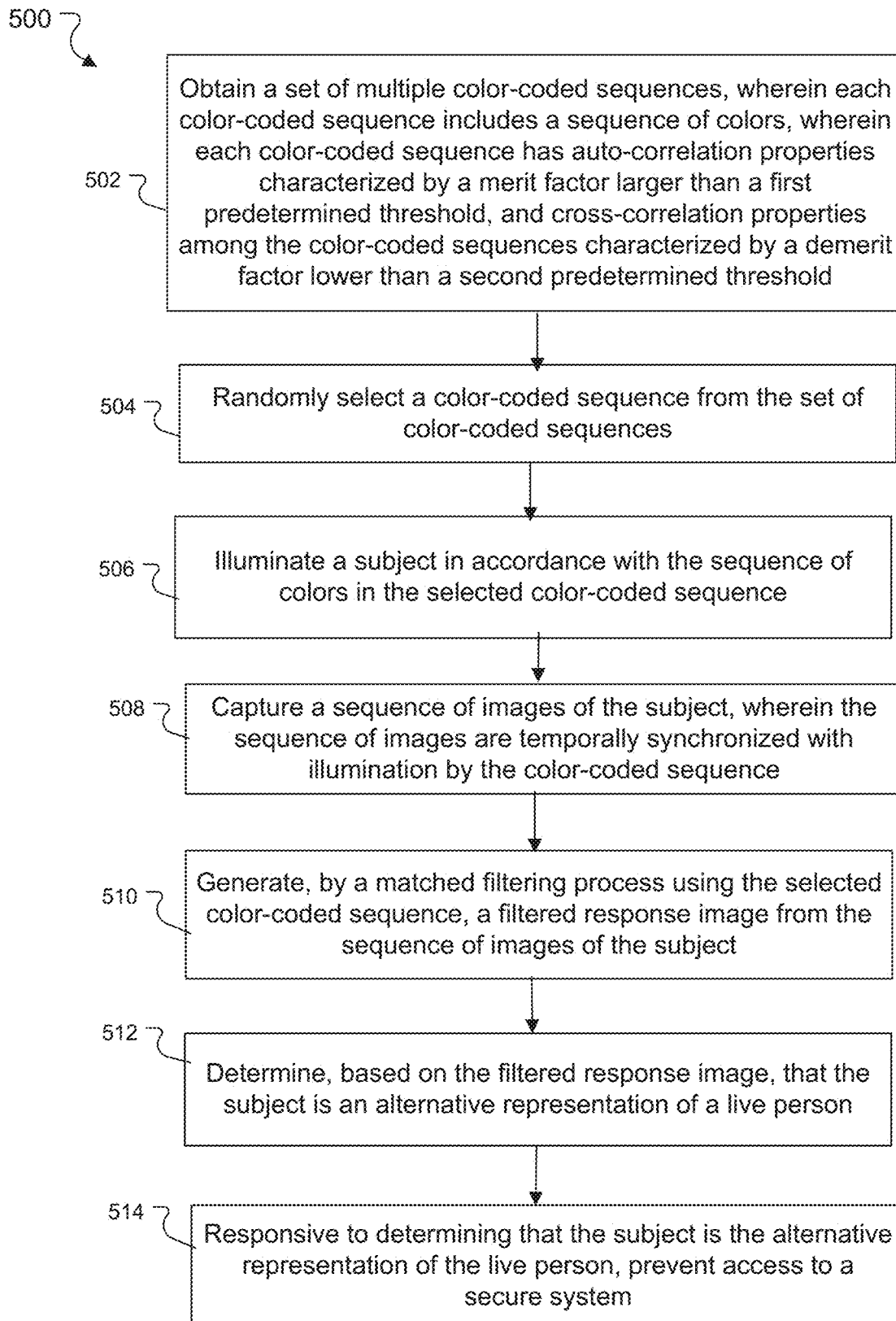
FIG. 5 is a flowchart of an example process for liveness detection using active illumination with randomized color-coded sequence.

FIG. 5 is a flowchart of an example process 500 for liveness detection using active illumination with randomized color-coded sequence. In some implementations, at least a portion of the process 500 may be executed by one or more processing devices depicted in the environment 100 with reference to FIG. 1. In some implementations, at least a portion of the process 500 may be executed by the image analysis engine (e.g., 120 or 122 or 124) depicted in FIG. 1. In some implementations, at least a portion of the process 500 may be executed at one or more servers (such as servers or computing devices in a distributed computing system) in communication with remote components such as one or more processing devices disposed within a user device (e.g., the mobile device 102 or the kiosk device 104).

Operations of the process 500 include obtaining a set of multiple color-coded sequences (502). Each color-coded sequence includes a sequence of colors. Each color-coded sequence has auto-correlation properties characterized by the highest merit factor (or one of the highest merit factors), and cross-correlation properties among the color-coded sequences characterized by the lowest demerit factor (or one of the lowest demerit factors).

Operations of the process 500 also include randomly selecting a color-coded sequence from the set of color-coded sequences (504). Operations of the process 500 also include illuminating a subject in accordance with the sequence of colors in the selected color-coded sequence (506). In some implementations, a user device can illuminate the subject by showing the colors on a display screen of the user device. In some implementations, a user device can display the colors on the display screen except on the region where the face portion of the subject is displayed. For example, a mobile device can display an image of the subject in a user friendly preview experience. The mobile device can identify a region of the face, display the face region on the display screen, and can use the rest of the region on the display screen to display the colors.

Operations of the process 500 also include capturing a sequence of images of the subject, wherein the sequence of images are temporally synchronized with illumination by the color-coded sequence (508). In some implementations, the user device can capture the sequence of images using camera sensors of the user device. For example, a camera sensor can include three-dimensional sensors, e.g., RGB sensors. The camera sensor can capture a first signal using the RED sensor, a second signal using the GREEN sensor, and a third signal using the BLUE sensor.

For the purpose of anti-spoofing, the operations of the steps 506 or 508 can have additional randomness. In some implementations, the user device can randomize the starting point of the color sequence and capture the sequence of illuminated face image corresponding to the sequence of colors displayed on the screen. For example, for the "BYYWG" sequence in FIG. 2, at the starting point of the sequence can either be at the first color "B" of the sequence, or at the color "W" of the sequence. In some implementations, the user device can illuminate the color-coded sequence at a fixed frequency or at a frequency that varies. For example, for the "BYYWG" sequence in FIG. 2, the user device can illuminate the color "B" for 1 second, the two color "Y" for 5 seconds each, the color "W" for 0.5 second, and the color "G" for 3 seconds. When capturing the sequence of images, the user device are temporally synchronized with the illumination frequency. If the active illumination process uses variable illumination frequency, the capturing process also uses a synchronized variable frequency.

Operations of the process 500 also include generating, by a matched filtering process using the selected color-coded sequence, a filtered response image from the sequence of images of the subject (510). In some implementations, the image analysis engine can perform pre-processing on the sequence of images before generating the filtered response image. In some implementations, the subject is not still during the capturing of the sequence of images, the image analysis engine can generate, from the sequence of images, a sequence of spatially aligned images (e.g., the location and shape of the faces are spatially aligned among the captured images), and avoiding a request to recapture the images.

In some implementations, the user device can capture some padding images besides the illuminated images. If a color-coded sequence has length that equals five, the user device can capture five images before illumination, five images during illumination, and five images after illumination, i.e., a total of 15 images. The padding images can be useful when generating the spatially aligned images, e.g., using a facial landmark based alignment stabilization method. In some implementations, there is too much motion in the sequence of images that cannot be aligned or corrected, the image analysis engine can refrain from further processing of the sequence of the images, and may request a recapture of the images.

In some implementations, the image analysis engine can determine that one or more captured images are too bright. The liveness detection process relies on the depth information of the face of a live person, which is derived from the diffused reflections using the active illumination from the illumination device. If one or more captured images are too bright, the liveness detection process may not generate a reliable result because the depth information is lost when the ambient light dominates the active illumination. The image analysis engine can refrain from further processing of the sequence of the images, and may request a recapture of the images.

In some implementations, the image analysis engine can calculate a sequence of filtered response images by applying a matched filter to the sequence of spatially aligned images, wherein the matched filter corresponds to the selected color-coded sequence. The image analysis engine can select one or more filtered response images from the sequence of filtered response images. In some implementations, the image analysis engine can select the one or more filtered response images that have the maximum response.

Operations of the process 500 also include determining, based on the filtered response image, that the subject is an alternative representation of a live person (512). In some implementations, the alternative representation of the live person can include a photograph of the live person printed on paper, or presented on a display device. In some implementation, the alternative representation of the live person comprises video replay of the live person on a display device.

In some implementations, determining, based on the filtered response image, that the subject is the alternative representation of the live person can include processing the filtered response image using a machine learning process trained to discriminate between filtered response images of live people and filtered response images of alternative representations of the live people.

For example, the machine learning process can include processing the filtered response image using a trained image classification algorithm. The image classification algorithm was previously trained using sample filtered response images of live people and sample filtered response images of spoof attacks. The trained image classification algorithm can differentiate subtle shape and texture features in a filtered response image. The trained image classification algorithm can output a probability that an input filtered response image is generated from an active illumination of a live person. In some implementations, the image classification algorithm can include one or more convolutional neural network (CNN) models.

Operations of the process 500 also include preventing, responsive to determining that the subject is the alternative representation of the live person, access to a secure system (514). Preventing access to the secure system can include preemptively preventing any of the images to be further processed by the authentication server 108, thereby preventing access to the secure system. This in turn can improve performance of an underlying biometric authentication system by filtering out spoof attacks at a front end, and thereby reducing waste of computational resources.

In some implementations, operations of the process 500 can further include: randomly selecting a second color-coded sequence from the set of color-coded sequences; illuminating a second subject in accordance with the sequence of colors in the second color-coded sequence; capturing a second sequence of images of the second subject, wherein the second sequence of images are temporally synchronized with illumination by the second color-coded sequence; generating, by a matched filtering process using the second selected color-coded sequence, a second filtered response image from the second sequence of images of the second subject; determining, based on the second filtered response image, that the second subject is a live person; and responsive to determining that the second subject is the live person, initiating an authentication process for determining if the live person is authorized to access the secure system. This can include, for example, performing a face/iris/eye-print identification or verification based on the images of the subject to determine if the subject is authorized to access the secure system.

Figure 6:
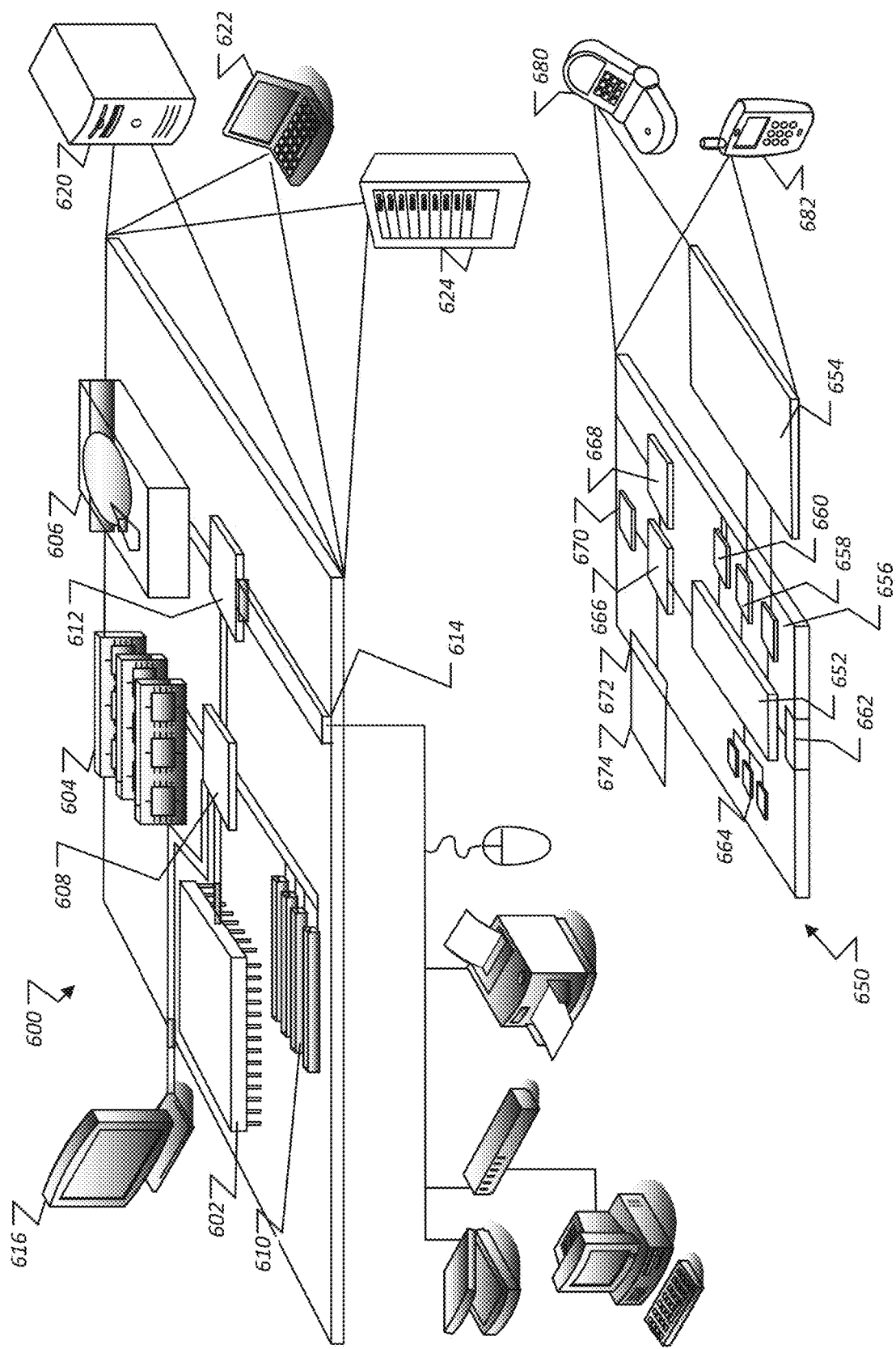
FIG. 6 is a block diagram representing examples of computing devices.

FIG. 6 shows an example of a computing device 600 and a mobile device 650, which may be used with the techniques described here. For example, referring to FIG. 1, the kiosk device 104 can include one or more of the computing device 600, either in part or in its entirety. The mobile device 102 can include one or more of the mobile device 650, either in part or in its entirety. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is an example only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing devices 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, and so forth) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, tablet computer, or other similar mobile device.

Figure 7:
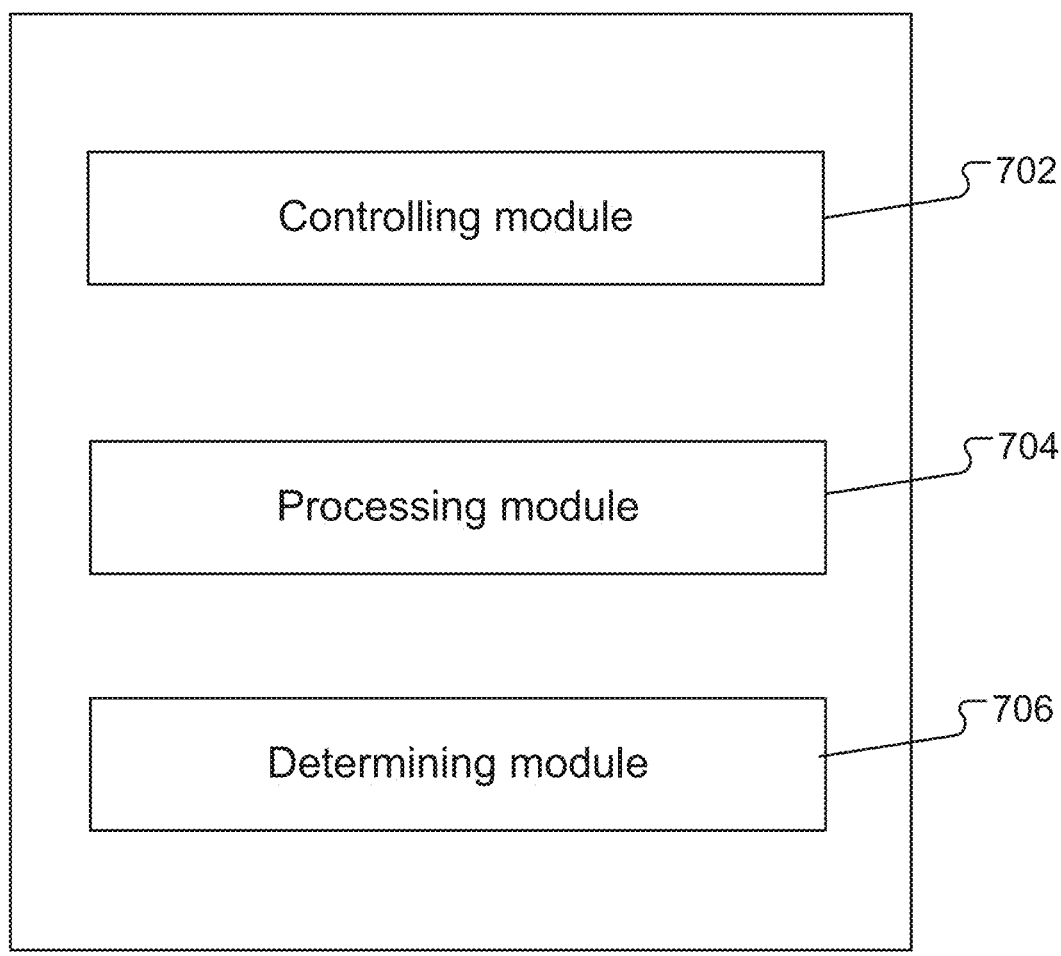
FIG. 7 depicts examples of modules of an apparatus in accordance with one or more embodiments of the present disclosure.

FIG. 7 depicts examples of modules of an apparatus 700 in accordance with one or more embodiments of the present disclosure. The apparatus can be an example of an embodiment of a system configured to perform biometric authentication using an illumination sequence. The apparatus 700 can correspond to the embodiments described above, and the apparatus 700 includes the following: a controlling module 702 that controls an image acquisition device to capture a sequence of images of a subject illuminated with a sequence of colors in a selected color-coded sequence, and the sequence of images are temporally synchronized with the illumination by the color-coded sequence; a processing module 704 that processes the sequence of images by a matched filtering process using the selected color-coded sequence and generates a filtered response image of the subject; and a determining module 706 that determines that the subject is an alternative representation of a live person based on the filtered response image. The selected color-coded sequence is randomly selected from a set of color-coded sequences. Each color-coded sequence includes a sequence of colors. Each color-coded sequence in the set of color-coded sequences has auto-correlation properties characterized by the highest merit factor (or one of the highest merit factors), and cross-correlation properties among the color-coded sequences in the set are characterized by the lowest demerit factor (or one or the lowest demerit factors). In response to determining that the subject is an alternative representation of a live person, the determining module 706 prevents access to a secure system.

In some embodiments, the alternative representation of the live person includes a photograph of the live person printed on paper, or presented on a display device.

In some embodiments, the alternative representation of the live person includes video replay of the live person on a display device.

In some embodiments, the determining module 706 determines that the subject is an alternative representation of a live person based on the filtered response image by: processing the filtered response image using a machine learning process trained to discriminate between filtered response images of live persons and filtered response images of alternative representations of the live persons.

In some embodiments, the processing module 704 generates the filtered response image from the sequence of images of the subject by a matched filtered process using the selected color-coded sequence by: generating, from the sequence of images, a sequence of spatially aligned images; calculating a sequence of filtered response images by applying a matched filter to the sequence of spatially aligned images, wherein the matched filter corresponds to the selected color-coded sequence; and selecting the filtered response image from the sequence of filtered response images.

In some embodiments, the first merit factor is defined as:

$$\sum_{d=1}^{M} \frac{|C_{f,f}(0, d)|^2}{\sum_{s'=0}^{2N-1} |C_{f,f}(s, d)|^2},$$

wherein M is a total number of colors in a color-coded sequence, N is length of the color-coded sequence, d is an index for the colors, $C_{f,f}$ is a one-dimensional discrete auto-correlation function of a color-coded sequence f, s is a correlation index in the function $C_{f,f}$.

In some embodiments, the second merit factor is defined as:

$$\sum_{d=1}^{M} \frac{\sum_{s!=0}^{2N-1} |C_{f,g}(s,d)|^2}{|C_{f,f}(0,d)| \cdot |C_{g,g}(0,d)|},$$

wherein $C_{g,g}$ is a one-dimensional discrete auto-correlation of a color-coded sequence g, $C_{f,g}$ is a one-dimensional discrete cross-correlation of the color-coded sequence f and the color-coded sequence g.

In some embodiments, the controlling module 702 controls the image acquisition device to capture a second sequence of images of a second object illuminated by a second color-coded sequence. The second sequence of images are temporally synchronized with the illumination by the second color-coded sequence. The second color-coded sequence is randomly selected from the set of color-coded sequences. The processing module 704 generates a second filtered response image from the second sequence of images of the second subject by a matched filtering process using the second selected color-coded sequence. The determining module 706 determines that the second subject is a live person based on the second filtered response image.

In some embodiments, the apparatus 700 includes an initiating module that initiates an authentication process for determining if the live person is authorized to access the secure system in response to determining that the second subject is a live person.

Various implementations of the systems and techniques described here can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which may be for a special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural, object-oriented, assembly, and/or machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a cathode ray tube (CRT) or liquid crystal display (LCD) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a GUI or a web browser through which a user can interact with an implementation of the systems and techniques described here), or any combination of such back end, middleware, or front end components. The components of the system can be interconnected by any form or medium of digital data communication, such as network 210 of FIG. 2. Examples of communication networks include a LAN, a WAN, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications may be made without departing from the scope of the inventive concepts described herein, and, accordingly, other implementations are within the scope of the following claims.

What is claimed is:

1. A computer-implemented method comprising:
    obtaining a set of multiple color-coded sequences, wherein each color-coded sequence comprises a sequence of colors, wherein each color-coded sequence has auto-correlation properties characterized by a merit factor larger than a first predetermined threshold, and cross-correlation properties among the color-coded sequences characterized by a demerit factor lower than a second predetermined threshold;
    randomly selecting a color-coded sequence from the set of color-coded sequences;
    illuminating a subject in accordance with the sequence of colors in the selected color-coded sequence;
    capturing a sequence of images of the subject, wherein the sequence of images are temporally synchronized with illumination by the color-coded sequence;
    generating, by a matched filtering process using the selected color-coded sequence, a filtered response image from the sequence of images of the subject;
    determining, based on the filtered response image, that the subject is an alternative representation of a live person; and
    responsive to determining that the subject is the alternative representation of the live person, preventing access to a secure system.

2. The method of claim 1, wherein the alternative representation of the live person comprises a previously captured photograph of the live person printed on paper, or an image presented on a display device.

3. The method of claim 1, wherein the alternative representation of the live person comprises video replay of the live person on a display device.

4. The method of claim 1, wherein determining, based on the filtered response image, that the subject is the alternative representation of the live person comprises processing the filtered response image using a machine learning process trained to discriminate between filtered response images of live persons and filtered response images of alternative representations of the live persons.

5. The method of claim 1, wherein generating, by the matched filtering process using the selected color-coded sequence, the filtered response image from the sequence of images of the subject comprises:
generating, from the sequence of images, a sequence of spatially aligned images;
calculating a sequence of filtered response images by applying a matched filter to the sequence of spatially aligned images, wherein the matched filter corresponds to the selected color-coded sequence; and
selecting the filtered response image from the sequence of filtered response images.

6. The method of claim 1, wherein the merit factor is defined as:

$$\sum_{d=1}^{M} \frac{|C_{f,f}(0,d)|^2}{\sum_{s!=0}^{2N-1} |C_{f,f}(s,d)|^2},$$

wherein M is a total number of colors in the color-coded sequence, N is length of the color-coded sequence, d is an index for the colors, $C_{f,f}$ is a one-dimensional discrete auto-correlation function of a color-coded sequence f, s is a correlation index in the function $C_{f,f}$, and wherein the demerit factor is defined as:

$$\sum_{d=1}^{M} \frac{\sum_{s!=0}^{2N-1} |C_{f,g}(s,d)|^2}{|C_{f,f}(0,d)| \cdot |C_{g,g}(0,d)|},$$

wherein $C_{g,g}$ is a one-dimensional discrete auto-correlation of a color-coded sequence g, $C_{f,g}$ is a one-dimensional discrete cross-correlation of the color-coded sequence f and the color-coded sequence g.

7. The method of claim 1, further comprising:
randomly selecting a second color-coded sequence from the set of color-coded sequences;
illuminating a second subject in accordance with the sequence of colors in the second color-coded sequence;
capturing a second sequence of images of the second subject, wherein the second sequence of images are temporally synchronized with illumination by the second color-coded sequence;
generating, by a matched filtering process using the second selected color-coded sequence, a second filtered response image from the second sequence of images of the second subject;
determining, based on the second filtered response image, that the second subject is a live person; and
responsive to determining that the second subject is the live person, initiating an authentication process for determining if the live person is authorized to access the secure system.

8. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:
obtaining a set of multiple color-coded sequences, wherein each color-coded sequence comprises a sequence of colors, wherein each color-coded sequence has auto-correlation properties characterized by a merit factor larger than a first predetermined threshold, and cross-correlation properties among the color-coded sequences characterized by a demerit factor lower than a second predetermined threshold;
randomly selecting a color-coded sequence from the set of color-coded sequences;
illuminating a subject in accordance with the sequence of colors in the selected color-coded sequence;
capturing a sequence of images of the subject, wherein the sequence of images are temporally synchronized with illumination by the color-coded sequence;
generating, by a matched filtering process using the selected color-coded sequence, a filtered response image from the sequence of images of the subject;
determining, based on the filtered response image, that the subject is an alternative representation of a live person; and
responsive to determining that the subject is the alternative representation of the live person, preventing access to a secure system.

9. The computer-implemented system of claim 8, wherein the alternative representation of the live person comprises a previously captured photograph of the live person printed on paper, or an image presented on a display device.

10. The computer-implemented system of claim 8, wherein the alternative representation of the live person comprises video replay of the live person on a display device.

11. The computer-implemented system of claim 8, wherein determining, based on the filtered response image, that the subject is the alternative representation of the live person comprises processing the filtered response image using a machine learning process trained to discriminate between filtered response images of live persons and filtered response images of alternative representations of the live persons.

12. The computer-implemented system of claim 8, wherein generating, by the matched filtering process using the selected color-coded sequence, the filtered response image from the sequence of images of the subject comprises:
generating, from the sequence of images, a sequence of spatially aligned images;
calculating a sequence of filtered response images by applying a matched filter to the sequence of spatially aligned images, wherein the matched filter corresponds to the selected color-coded sequence; and
selecting the filtered response image from the sequence of filtered response images.

13. The computer-implemented system of claim 8, wherein the merit factor is defined as:

$$\sum_{d=1}^{M} \frac{|C_{f,f}(0,d)|^2}{\sum_{s!=0}^{2N-1} |C_{f,f}(s,d)|^2},$$

wherein M is a total number of colors in the color-coded sequence, N is length of the color-coded sequence, d is an index for the colors, $C_{f,f}$ is a one-dimensional discrete auto-correlation function of a color-coded sequence f, s is a correlation index in the function $C_{f,f}$, and wherein the demerit factor is defined as:

$$\sum_{d=1}^{M} \frac{\sum_{s!=0}^{2N-1} |C_{f,g}(s,d)|^2}{|C_{f,f}(0,d)| \cdot |C_{g,g}(0,d)|},$$

wherein $C_{g,g}$ is a one-dimensional discrete auto-correlation of a color-coded sequence g, $C_{f,g}$ is a one-dimensional discrete cross-correlation of the color-coded sequence f and the color-coded sequence g.

14. The computer-implemented system of claim 8, the operations further comprise:
   randomly selecting a second color-coded sequence from the set of color-coded sequences;
   illuminating a second subject in accordance with the sequence of colors in the second color-coded sequence;
   capturing a second sequence of images of the second subject, wherein the second sequence of images are temporally synchronized with illumination by the second color-coded sequence;
   generating, by a matched filtering process using the second selected color-coded sequence, a second filtered response image from the second sequence of images of the second subject;
   determining, based on the second filtered response image, that the second subject is a live person; and
   responsive to determining that the second subject is the live person, initiating an authentication process for determining if the live person is authorized to access the secure system.

15. A non-transitory, computer-readable medium storing one or more instructions executable by a computer system to perform operations comprising:
   obtaining a set of multiple color-coded sequences, wherein each color-coded sequence comprises a sequence of colors, wherein each color-coded sequence has auto-correlation properties characterized by a merit factor larger than a first predetermined threshold, and cross-correlation properties among the color-coded sequences characterized by a demerit factor lower than a second predetermined threshold;
   randomly selecting a color-coded sequence from the set of color-coded sequences;
   illuminating a subject in accordance with the sequence of colors in the selected color-coded sequence;
   capturing a sequence of images of the subject, wherein the sequence of images are temporally synchronized with illumination by the color-coded sequence;
   generating, by a matched filtering process using the selected color-coded sequence, a filtered response image from the sequence of images of the subject;
   determining, based on the filtered response image, that the subject is an alternative representation of a live person; and
   responsive to determining that the subject is the alternative representation of the live person, preventing access to a secure system.

16. The non-transitory, computer-readable medium of claim 15, wherein the alternative representation of the live person comprises a previously captured photograph of the live person printed on paper, or an image presented on a display device.

17. The non-transitory, computer-readable medium of claim 15, wherein the alternative representation of the live person comprises video replay of the live person on a display device.

18. The non-transitory, computer-readable medium of claim 15, wherein determining, based on the filtered response image, that the subject is the alternative representation of the live person comprises processing the filtered response image using a machine learning process trained to discriminate between filtered response images of live persons and filtered response images of alternative representations of the live persons.

19. The non-transitory, computer-readable medium of claim 15, wherein generating, by the matched filtering process using the selected color-coded sequence, the filtered response image from the sequence of images of the subject comprises:
   generating, from the sequence of images, a sequence of spatially aligned images;
   calculating a sequence of filtered response images by applying a matched filter to the sequence of spatially aligned images, wherein the matched filter corresponds to the selected color-coded sequence; and
   selecting the filtered response image from the sequence of filtered response images.

20. The non-transitory, computer-readable medium of claim 15, wherein the merit factor is defined as:

$$\sum_{d=1}^{M} \frac{|C_{f,f}(0,d)|^2}{\sum_{s!=0}^{2N-1} |C_{f,f}(s,d)|^2},$$

wherein M is a total number of colors in the color-coded sequence, N is length of the color-coded sequence, d is an index for the colors, $C_{f,f}$ is a one-dimensional discrete auto-correlation function of a color-coded sequence f, s is a correlation index in the function $C_{f,f}$, and wherein the demerit factor is defined as:

$$\sum_{d=1}^{M} \frac{\sum_{s!=0}^{2N-1} |C_{f,g}(s,d)|^2}{|C_{f,f}(0,d)| \cdot |C_{g,g}(0,d)|},$$

wherein $C_{g,g}$ is a one-dimensional discrete auto-correlation of a color-coded sequence g, $C_{f,g}$ is a one-dimensional discrete cross-correlation of the color-coded sequence f and the color-coded sequence g.

* * * * *